United States Patent [19]

Cummings et al.

[11] Patent Number: 5,107,618
[45] Date of Patent: Apr. 28, 1992

[54] TROTLINE FISHHOOK HOLDER

[76] Inventors: Jimmie R. Cummings; Martha F. Cummings; Ervin J. Mallonee; Christine L. Mallonee, all of 1800 S. Lake Rd., Chandler, Okla. 74834

[21] Appl. No.: 709,042

[22] Filed: Jun. 3, 1991

[51] Int. Cl.⁵ .............................. A01K 97/00
[52] U.S. Cl. ........................................ 43/57.3
[58] Field of Search ............... 43/57.3, 27.4, 57.2

[56] References Cited

U.S. PATENT DOCUMENTS

| | | | |
|---|---|---|---|
| 2,555,397 | 6/1951 | Coward | 43/57.3 |
| 2,804,716 | 9/1957 | Adkison | 43/57.3 |
| 3,047,978 | 8/1962 | Glover | 43/57.3 |
| 3,104,489 | 9/1963 | Ford | 43/57.3 |
| 3,466,785 | 9/1969 | Shook | 43/57.3 |
| 3,703,783 | 11/1972 | Pool | 43/57.3 |
| 3,945,144 | 3/1976 | Purselley | 43/57.3 |

Primary Examiner—Kurt Rowan
Assistant Examiner—James Miner
Attorney, Agent, or Firm—Robert K. Rhea

[57] ABSTRACT

A trotline fishhook holder and fishhook guard is formed by an elongated sleeve having a coextensive slit in its wall. One end of the sleeve is closed by a base end cap and supports an elongated rod coextensive with the sleeve adjacent its inner wall surface opposite the position of the slit for receiving fishhooks when manually placed within the sleeve with the fishhook inverted and its curved end portion overlying an intermediate portion of the rod. The shank of the fishhook projects outwardly through the sleeve slit. A top cap closes the other end of the sleeve.

1 Claim, 1 Drawing Sheet

TROTLINE FISHHOOK HOLDER

BACKGROUND OF THE INVENTION

1. Field of the Invention

This invention relates to fishing equipment and more particularly to a storage device for the fishhooks of trotlines when not in use.

A trotline is a passive form of fishing for game fish and comprises an elongated length of line stretched between two points of anchorage near the surface of a body of water. A plurality of leaders are fastened to the line in spaced apart relation, each supporting a fishhook for holding fish bait at its depending end below the surface of the water. One of the problems associated with such a trotline is the storage thereof in a safe condition or temporary storage while moving the trotline from one place to another without the fishhooks and leaders becoming entangled or posing a hazard to the handlers thereof.

This invention provides a temporary or permanent storage for the fishhooks of a trotline when separated from the line permitting it to be easily rolled up.

2. Description of the Prior Art

The prior art generally discloses guards which house single or multiple hooks while attached to the trotline by leaders in order for the fishhooks, guards and line to be disarmed or neutralized for storage or transport.

This invention provides a housing-like holder for the fishhooks of a trotline when the fishhooks and their leaders are separated from the line for temporary or permanent storage.

SUMMARY OF THE INVENTION

An elongated sleeve is provided with a longitudinal slit in its wall capable of freely receiving the shank of a trotline hook. A cap permanently closes one end of the sleeve. A coextensive rod assembly is supported within the sleeve by its closed end and is disposed adjacent the inner surface of the sleeve opposite its slit.

The rod assembly receives individual trotline fishhooks when inverted and placed thereon with the shank of the respective fishhook projecting outwardly through the sleeve slit.

Spring clips on the end of the leaders opposite the fishhooks permit the fishhooks and leaders to be quickly removed from or attached to a trotline at the will of the operator.

The principal object of this invention is to provide a trotline fishhook holder and storage device which surrounds the major portion of trotline fishhooks when the fishhooks are disposed within the holder in juxtaposed relation which eliminates any danger of the hook portion of a fishhook being exposed while supported by the holder.

DESCRIPTION OF THE PREFERRED EMBODIMENTS

Figure 1:
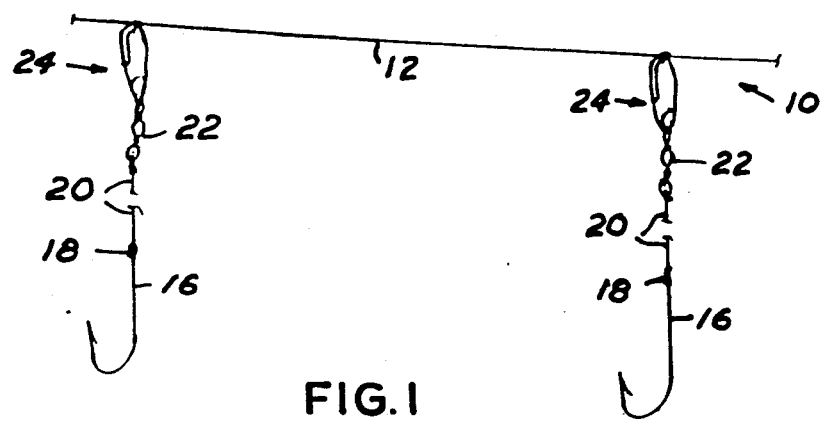
FIG. 1 is a fragmentary perspective view of a trotline.
Figure 2:
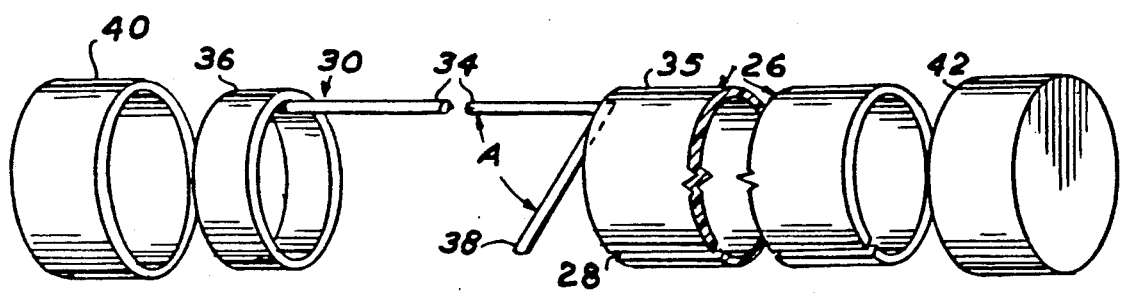
FIG. 2 is a fragmentary exploded perspective view of the fishhook holder, per se.
Figure 3:
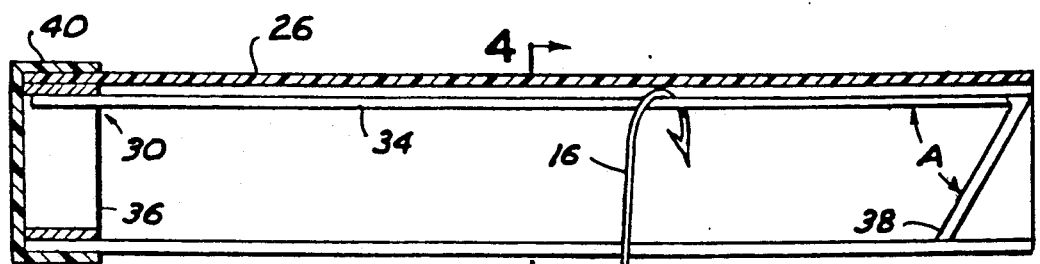
FIG. 3 is a longitudinal cross sectional view of the assembled components of FIG. 2, with the top cap removed for receiving a plurality of fishhooks.

Like characters of reference designate like parts in those figures of the drawings in which they occur.

In the drawings:

The reference numeral 10 indicates a fragment of a trotline 12 having a plurality of trotline fishhook assemblies 14 secured thereto in depending operative relation with the trotline 12 extended across a body of water, not shown, and anchored at its respective ends.

Each of the trotline hook assemblies comprises a fishhook 16 commonly referred to as a No. 7 fishhook. The eye 18 of the fishhook is connected with a leader 20 of selected length inturn connected at its opposite end with a fishing line swivel 22 inturn secured to a spring clip 24 frictionally gripping the trotline 12 as hereinafter explained.

The length of the fishhook assembly 14 and its spacing with respect to the next adjacent fishhook assembly 14 is selected in accordance with the distance of the fishhook from the line 12 so that one fishhook assembly 14 will not normally become entangled with another or adjacent fishhook assembly.

The reference numeral 25 indicates the fishhook holder comprising an elongated open end sleeve 26 which may be a selected length and diameter of plastic pipe, or the like. The sleeve 26 is provided with a coextensive slit 28 in its wall of sufficient width to freely receive, in sliding relation, the shank of one of the fishhooks 16 as presently explained.

A fishhook rack or rod assembly 30 is supported within the sleeve 26. The rod assembly comprises a length of heavy gauge wire or rod material 34, substantially coextensive with the sleeve 26, relatively small, approximately $\frac{1}{8}$ inch diameter, when compared with the diameter of the sleeve.

One end portion of the rod 34 is rigidly connected, as by soldering or welding, to the inner periphery of a sleeve bushing 36 frictionally received within the base end portion 35 of the sleeve thus disposing the rod 34 in close spaced relation with the inner wall surface of the sleeve substantially diametrically opposite the slit 28.

The end of the rod 34 opposite the bushing 36 is attached to one end of a strut 38 on an acute angle A. The other end of the strut 38 is supported by the inner wall of the sleeve 26 adjacent the slit (FIG. 4).

A base end cap 40 including a cap wall permanently closes the base end 35 of the sleeve and a top end cap 42 closes the opposite end of the sleeve after the fishhooks 16 are placed therein.

OPERATION

Figure 4:
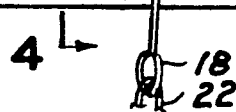
FIG. 4 is a vertical cross sectional view taken substantially along the line 4—4 of FIG. 3; and, FIG. 5 is a perspective view of a clip illustrating a preferred manner of attaching a leader to a trotline.

As each trotline assembly 14 is removed from the trotline 12, in the manner presently explained, the fishhook 16 is manually grasped by its shank and inverted from the position shown by FIG. 1 and while inverted is manually moved laterally into the open end of the sleeve, after removing the cap 42, so that the arcuate bend in the fishhook, between its shank and its hook end, transversely overlies the rod 34 and the shank of the fishhook extends outwardly of the sleeve through the slit 28 (FIG. 4). The rearwardly inclined position of the strut 38 facilitates placing the fishhooks on the rod 34.

The leader 20, swivel 22 and spring clip 24 depend from the sleeve when the fishhook is supported by the rod assembly 30.

The spacing between the rod 34 and the inner wall surface of the sleeve 26 is such that the arcuately curved end portion of the fishhook may be freely moved longitudinally of the sleeve but is insufficient for the fishhook to be removed in a lateral direction from the rod 34 except by separating the fishhook from the sleeve and rod assembly through the sleeve open end.

The remaining fishhook assemblies 14 are removed from the trotline 12 in succession and place within the sleeve on the rod assembly as just described.

Figure 5:
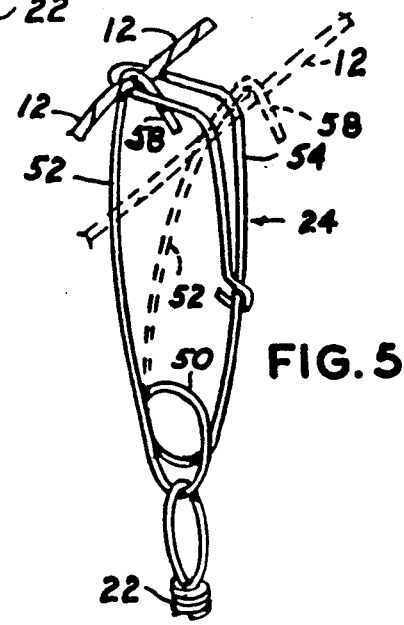

Referring now more particularly to FIG. 5, the spring clip 24 comprises a length of spring steel wire forming a single convolution spring coil 50 substantially medially its ends and defining cooperating respective end portions 52 and 54.

The end portion 54 is doubled back upon itself to form an elongated loop 56 with the terminal end portion of the loop end extending laterally toward the end portion 52 in the plane of the coil 50.

The opposite end portion 52 has a portion of its free end angularly doubled back upon itself toward the loop 56 and spring coil, as at 58, and partially disposed within the laterally extending portion of the loop 56.

Pressure manually applied to the wire end portions 52 and 54, as by the thumb and forefinger of the user, moves the end portion 52 into the loop 56 to its dotted position projecting beyond the confines of the loop 56 so that the flexible trotline 12 may be placed under the back turned end portion 58 and be frictionally gripped between the loop forming wire members and the back turned end portion 58 when the wire end portions 52 and 54 are released to their solid line position.

It seems obvious that the clip 24 may be removed from the trotline 12 by reversing the line attaching procedure just described.

Obviously the invention is susceptible to changes or alterations without defeating its practicability. Therefore, we do not wish to be confined to the preferred embodiment shown in the drawings and described herein.

We claim:

1. A trotline fishhook holder comprising:
   an elongated sleeve having a coextensive slit in a wall thereof;
   a first cap closing one end of the sleeve and having a cap wall surrounding the adjacent end portion of said sleeve;
   a sleeve bushing frictionally nested by the inner surface of said one end portion of the sleeve;
   rod means comprising an elongated rod coextensive with said sleeve and longitudinally secured at one end portion to the sleeve slit and projecting toward the other end of said sleeve in close spaced relation with respect to its inner surface for supporting the hook end portion of a plurality of fishhooks in juxtaposed relation with the shank portion of the respective fishhook projecting through the sleeve wall slit;
   strut means for supporting the end portion of said rod opposite the bushing including a strut secured at one end to the end of said rod opposite the bushing, in angular relation with respect to the longitudinal axis of the rod and contacting at its other end the inner surface of said sleeve; and,
   a second cap closing the other end of said sleeve.

* * * * *